April 5, 1960     W. B. HANDWERK ET AL     2,931,146
APPARATUS FOR GRINDING PIPE ENDS PREPARATORY
TO INTERCONNECTION BY WELDING
Filed Aug. 18, 1958     2 Sheets-Sheet 1

INVENTORS.
William B. Handwerk
Estill Sherrill
BY
ATTORNEY.

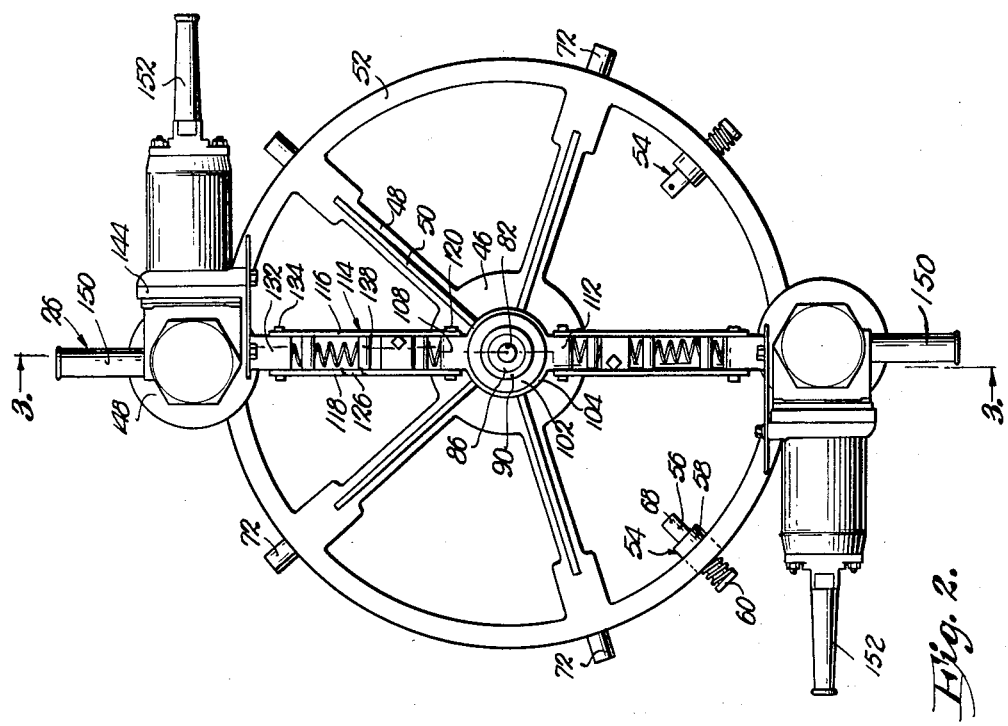

United States Patent Office 2,931,146
Patented Apr. 5, 1960

2,931,146

APPARATUS FOR GRINDING PIPE ENDS PREPARATORY TO INTERCONNECTION BY WELDING

William B. Handwerk and Estill Sherrill, Tulsa, Okla., assignors to M. J. Crose Manufacturing Co., Inc., Tulsa, Okla., a corporation of Oklahoma Application August 18, 1958, Serial No. 755,668

5 Claims. (Cl. 51—241)

This invention relates generally to apparatus for grinding the ends of substantially cylindrical pipes of relatively large diameter and, more particularly, to such apparatus which is especially adapted for grinding off a portion of the beveled ends of large diameter, metallic pipes preparatory to welding a pair of such pipes together in the manner commonly referred to in the industry as "double jointing."

Previously available types of apparatus for grinding the ends of relatively large diameter pipes have each been subject to various disadvantages rendering the same troublesome or dangerous to operate, inefficient in producing a ground surface of the required uniformity or impractical from the economic point of view by virtue of the slowness by which same could be operated or the number of personnel required.

Accordingly, it is the primary object of this invention to provide an improved type of grinding apparatus which may be easily, safely and quickly operated by a single man to perform grinding operations of the kind referred to with a high degree of precision.

It is another important object of this invention to provide such improved grinding apparatus which is adapted for convenient, releasable securement directly to the pipe during the grinding operation with the interconnecting structures extending internally of the pipe so as not to interfere with the operation of the grinding tool.

Another important object of this invention is to provide such apparatus in which the grinding tool is mounted for revolution about an axis aligned with the central longitudinal axis of the pipe whose end is to be ground, so that the grinding tool may be advanced continuously and repeatedly over the annular surface of the pipe being ground.

Another important object of this invention is to provide such apparatus which includes means for maintaining a substantially constant pressure between the grinding tool and the surface of the pipe being ground during advancement of the tool along such surface.

Another important object of this invention is to provide such apparatus which is relatively simple and, therefore, inexpensive to produce and relatively light in weight without sacrifice of operating characteristics so that the same may be conveniently maneuvered by a single operator both during installation and removal relative to a pipe and during the grinding operation.

Still other objects of the invention will be made clear or become apparent as the following description of an illustrative, preferred embodiment of the invention progresses.

In the accompanying drawings:

Fig. 2 is a rear side elevational view of a currently preferred form of the improved grinding apparatus, with the clamp crank handle removed for clarity of illustration; and Fig. 3 is a cross-sectional view taken on line 3—3 of Fig. 2.

Figure 1:
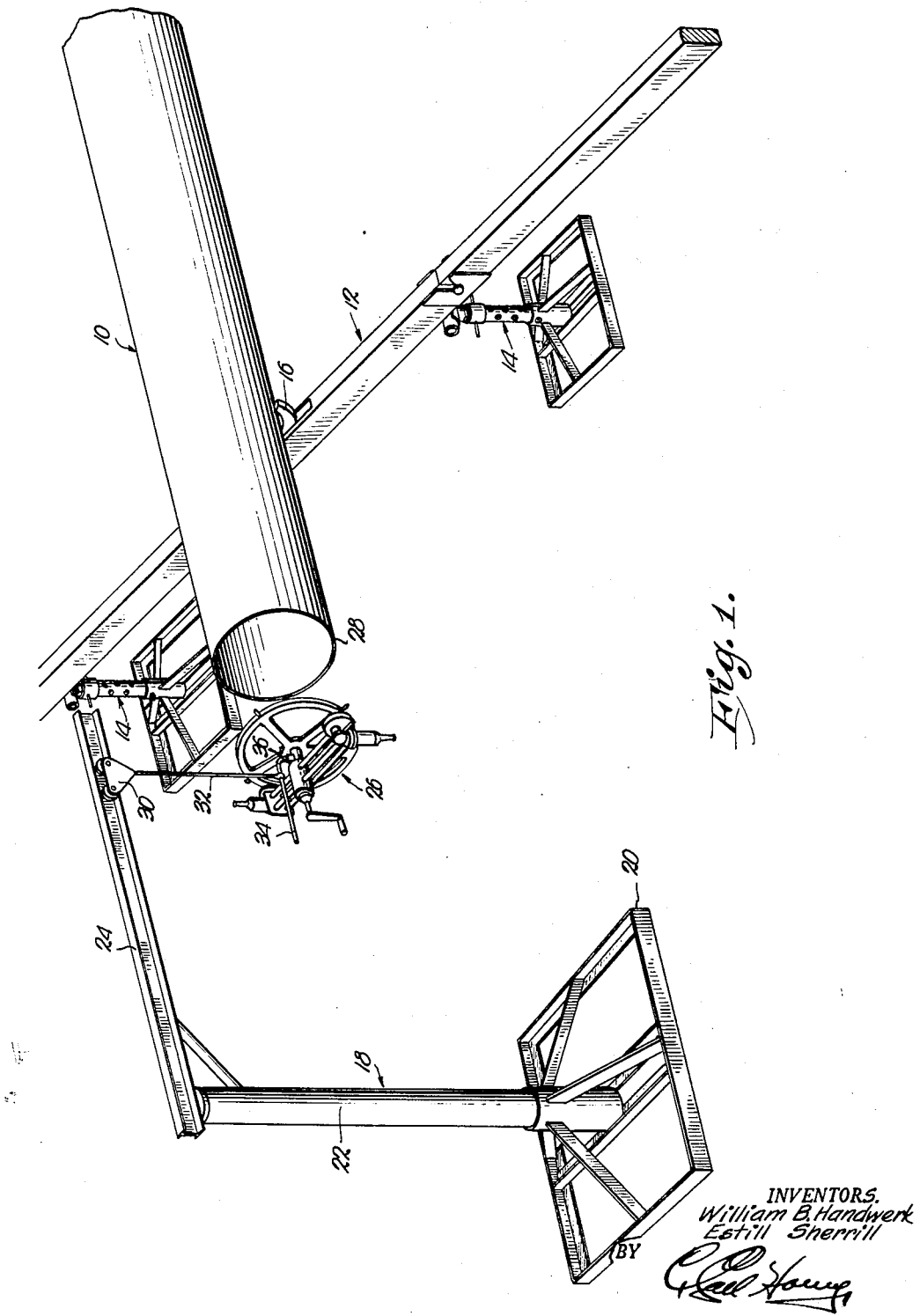
Fig. 1 is a fragmentary, perspective view of a portion of a double-jointing yard layout illustrating the general surroundings in which the improved apparatus of this invention finds great utility, it being noted that in such figure, because of scale, certain details of the apparatus have been omitted and are illustrated in the other figures.

Referring now particularly to Fig. 1, the numeral 10 generally designates an elongated, cylindrical pipe of relatively large diameter which is supported upon a spaced pair of elevated tracks, one of which is shown in Fig. 1 and generally designated by the numeral 12, it being understood that a parallel track of like character would also be provided for supporting the other half of the pipe 10.

As shown, such tracks 12 are normally supported upon adjustable skid jacks 14 spaced along the track 12 and often so adjusted in height to provide a slight incline to the tracks 12 so that the pipe 10 may advance therealong by gravity. Releasable skid stops such as the one illustrated at 16 may be provided in the tracks 12 to stop the pipe 10 at a given position.

A gantry boom assembly generally designated by the numeral 18 and having a base 20 supporting an upright standard 22 to which is secured a horizontally extending, tracked boom arm 24 may be provided adjacent a position at which the pipe 10 may be stopped and held by skid 16 or the like for the purpose of supporting the grinding apparatus 26 contemplated by the invention at a location convenient to the end 28 to be ground upon the pipe 10.

It is to be understood that the gantry boom assembly 18 is normally utilized to support the grinding apparatus 26 only between periods of grinding operation and during installation and removal of the apparatus 26 from the pipe 10. A satisfactory manner of suspending the apparatus 26 from the gantry boom assembly 18 will include the provision of a wheeled carriage 30 adapted to be moved along the tracked arm 24, a flexible cable or the like 32 depending from the carriage 30 and secured at its lowermost end to an L-shaped boomer handle 34, which handle 34 may be utilized by the operator for manipulating the apparatus 26 during installation or removal of the latter from the pipe 10. The boomer handle 34 may be releasably secured to the apparatus 26 in any suitable fashion such as providing the same with a hook, although for illustrative purposes, the downwardly extending leg 36 of handle 34 may be inserted into a socket 38 (see Fig. 3) provided for such purpose upon the apparatus 26 with the leg 36 and socket 38 being provided with cooperating holes for receiving a releasable holding pin (not shown).

Before proceeding to a more detailed description of the apparatus 26, with respect to which it is to be understood that Fig. 1 is intended to illustrate only certain of the major structural aspects, it may be observed that a typical grinding operation for which the apparatus is adapted, is presented when the pipe 10 is to be used as one joint of a double-jointed pipe and is initially normally beveled adjacent the end 28 thereof. In order for the welding operation involved in double-jointing to be performed in proper manner, it is necessary for a portion of the beveling at end 28 of pipe 10 to be ground away to present a clean and uniformly planar annular surface at the end 28 of pipe 10. With this typical application of the apparatus 26 in mind, the further details of construction and operation of such apparatus 26 may now be explained.

Apparatus 26 includes a frame broadly designated 40, having an elongated, cylindrical sleeve portion 42 adapted to be coaxially aligned with the pipe 10 when the apparatus 26 is installed upon the latter and a web portion 44 having an annular center part 46 secured to one end of the sleeve portion 42 from which center portion 46 extend a plurality of spoke parts 48, each provided with a reinforcing fin 50 and integrally interconnected at their outermost ends with an annular rim 52.

The rim 52 carries at spaced intervals therearound a number of locating pin assemblies generally designated 54, each including a radial pin 56 extending through a bushing 58 on the rim 52 and provided at its outermost end with an elongated guide member 60 having an inwardly inclined, forward end portion 62 and a stop projection 64 adjacent its rear extremity. A spring 66 is provided between the bushing 58 and the member 60 of each assembly 54 for the purpose of yieldably biasing the pin 56 and guide member 60 thereof outwardly, there being a stop pin 68 adjacent the end of pin 56 opposite member 60 for limiting the extent of outward reciprocation of the pin 56 under the influence of the spring 66. The purpose of locating pin assemblies 54 is to guide the rim 52 of frame 40 into the open end of the pipe 10 during installation of the assembly 26 upon the pipe 10, it being understood that the inwardly inclined portion 62 of the members 60 will initially engage the end 28 of pipe 10 and that the pins 56 and guide members 60 will then all be reciprocated inwardly against the force of the spring 66 as the assembly is further advanced into the pipe 10.

There are also provided at intervals around the periphery of rim 52, in angularly offset relation to the location of the locating pin assemblies 54, a plurality of clamp pin bushings 70, each reciprocably carrying a clamp pin 72 whose longitudinal axis extends radially to the axis of rim 52. The clamp pins 72 are adapted upon outward reciprocation thereof after the rim 52 has been inserted within the open end of the pipe 10, to engage the interior of pipe 10 to secure the frame 40 of assembly 26 to the pipe 10.

Although various means for reciprocating the clamping pin 72 could conceivably be utilized, for example, hydraulic or pneumatic piston assemblies or the like, the preferred embodiment of the invention chosen for illustrative purposes employs a linkage element 74 for each clamping pin 72 respectively and pivotally connected with the innermost end of the latter as by a pin 76. The linkage elements 74 are all pivotally connected at their innermost ends by pins 78 to a clamping spider 80. An elongated screw shaft 82 having an intermediate threaded portion 84 is rotatably carried in the sleeve portion 42 of frame 40 by bushings 86 and 88.

A clamping screw nut 90 is provided on the sleeve portion 42, secured to the latter against rotation as by keying, and includes an internally threaded portion 92 extending into the sleeve 42 and there threadably engaging the threaded portion 84 of screw shaft 82. At the rear end thereof, the screw shaft 82 is provided with a removable manual clamp crank handle 94. At the forward end thereof, the screw shaft 82 extends forwardly from the sleeve 42 and rotatably, but nonreciprocably, receives the clamp spider 80 which rides upon a bearing hub 96 secured to the shaft 82 by means of a rear stop flange 98 on the latter and a forward retaining nut 100 threaded onto the forwardmost extremity of the shaft 82.

As will be apparent to those skilled in the art, when the handle 94 is turned by an operator to advance the screw shaft 82 in a forward direction (toward the left in Fig. 3) the links 74 will draw the clamping pins 72 inwardly toward a normal stand-by condition occupied by same during installation or removal of the assembly 26 relative to the pipe 10. However, upon the opposite turning of the handle 94 to advance the screw shaft 82 toward the rear (to the right in Fig. 3) the clamp spider 80 will be drawn rearwardly and move the link element 74 to shift the clamping pins 72 outwardly.

It is significant that the arrangement described provides a substantial mechanical or power advantage so that an operator may conveniently turn the crank 94 to produce an outward force upon the clamping pins 72 of such substantial magnitude that the frame 40 of apparatus 26 may be tightly secured to the pipe 10. It will further become clear hereinafter that the mounting of the assembly 26 upon the pipe 10 must be not only readily effectable and releasable, but also sufficiently secure to prevent shifting of the frame 40 during the grinding operation.

The sleeve portion 42 of frame 40 carries thereon rearwardly of the web 44, a bushing 102 upon which is rotatably received a grinder assembly hub 104. Hub 104 carries thereon a pair of opposed, radially extending pairs of brackets 106, 108, 110 and 112, the brackets 106 and 108 being on one side of the hub 104 and the brackets 110 and 112 being on the opposite side of the hub 104 in the preferred construction where a pair of opposed grinding assemblies are provided in order to balance the weight of same for rotation as will hereinafter be made clear. Since the two grinder assemblies and the mounting means therefor are identical, except that one is anchored to the brackets 106 and 108 while the other is oppositely anchored to the brackets 110 and 112, only one of same will be described in detail.

One of the tool carrying assemblies is generally designated by the numeral 114. Assembly 114 includes a first pair of linkage arms 116 and 118 pivotally connected with the bracket 108 at opposite ends of the latter by a pivot pin 120; a second pair of linkage arms 124 and 126 similarly coupled to the bracket 106 by a pivot pin 122; and a mounting plate 128 having a pair of inwardly extending brackets 130 and 132 thereon which are spaced apart the same distance as the brackets 106 and 108 on the hub 104. The outer ends of the linkage arms 116 and 118 are pivotally interconnected with the bracket 132 adjacent the ends of the latter by a pivot pin 134, while the outer ends of linkage arms 124 and 126 are pivotally coupled with the bracket 130 at opposite ends of the latter by a pivot pin 136. Thus, the mounting assembly 114 is adatped to act as a parallel motion device for maintaining the plate 128 parallel to the axis of rotation of the hub 104, regardless of the position of forward or rearward swing of the plate 128 relative to the hub 104. It may be noted that the linkage arms 116 and 118 are interconnected by a number of cross rods 138, and that the linkage arms 124 and 126 are similarly interconnected by a number of cross rods 140 to provide stability in the assembly 114.

Mounting upon the plate 128 of assembly 114 as by bolt and nut means 142, is a prime mover 144 for rotating a shaft 146 upon which is mounted for rotation therewith a grinding tool in the nature of a grinding wheel 148. Prime mover 144 may consist, for example, of a 3-phase electrical motor of about five horsepower rating, it having been found advantageous to utilize a motor of such ratings adapted to operate on 360 cycle electrical current in order to reduce the size and weight of the prime mover 144 required to drive the grinding wheel 148 with the necessary torque. In order to facilitate manipulation of the assemblies 114, motors 144 and grinding tools 148, handles as at 150 and 152 may be secured to the motors 144.

Each of the assemblies 114 preferably further includes one or more springs 154 having their ends oppositely secured to the hub 104 and a bracket 156 extending inwardly from the corresponding plate 128.

It will be clear to those skilled in the art, when an assembly 114 is moved forwardly "over center" with relation to the springs 154 associated therewith, the latter will yieldably bias the plate 128 of such assembly 114 and, therefore, the corresponding grinding wheel 148 against the end surface 28 of a pipe 10 to be ground. Such action results in the application of an even and uniform grinding pressure of the grinding wheel 148 upon the end surface 28 of the pipe 10. It will further be noted that the springs 154 will function, when a given assembly 114 and associated grinding wheel 148 is pulled rearwardly away from a pipe 10, to urge and hold such assembly 114 and 148 in a withdrawn position spaced away from the surface 28 of the pipe 10.

In order to prevent "jackknifing" of an assembly 114 under the influence of the springs 154, a fixed stop 158 and an adjustable stop 160 may be respectively provided upon the linkage arms 124 and 116, such stops 158 and 160 being alternately engageable with a stop block 162 mounted on the hub 104 and extending outwardly between the stops 158 and 160. It is particularly desirable that the stop 160 be made adjustable, as illustrated, since same can be utilized to control the maximum depth of grind which the corresponding tool 148 will make upon the end 28 of a pipe 10.

Operation

In operation, a pipe 10 is moved to a position disposing the end 28 thereof to be ground in general proximity to the grinding assembly 26 suspended from the gantry boom assembly 18. The operator then manually shifts the grinding assembly 26 toward the pipe 10 until the inwardly inclined end portions 62 of the guide members 60 have commenced to enter the open end 28 of the pipe 10. The operator then continues to urge grinding assembly 26 inwardly of the pipe 10 until the end surface 28 of the latter has engaged the stops 64 upon the guide members 60 of the various guide pin assemblies 54. At this point, the axis of sleeve 42 of frame 40 will be substantially aligned with the axis of the pipe 10. The operator then turns the crank 94 to shift the screw shaft 82 and the clamping spider 80 carried thereby, which shifts the linkage element 74 to reciprocate the clamping pins 72 outwardly and into tightly engaging relationship with the interior of the pipe 10.

After the clamping pins 72 have been effectively engaged with the pipe 10 to secure the frame 40 of the grinding apparatus 26 thereon, the handle 94 may be removed and the operator may, by pulling inwardly on the pins 68 of the guide assemblies 54 and rotating the same, shift the guide members 60 and their stops 64 inside of the pipe 10 where the same will not interfere with the grinding operation. The boomer handle 34 may then be removed from the assembly 26 which is now secured and held by the pipe 10. Next, the adjustable grinding stop assemblies 160 may be set to the desired depth of grind to be made upon the pipe 10, and the operator may swing the assemblies 114 forwardly toward the pipe 114 until the grinding wheels 148 engage surface 28 of the pipe 10 and are held against the latter by the force of springs 154.

Thereupon, the grinding operation may be commenced by activating the prime movers 144 to rotate the grinding wheels 148. The operator then rotates the hub 104 and the assemblies 114, prime movers 144, and grinding wheels 148 carried thereby, by manipulation of the handles 150 and 152. It is significant that the path of revolution of the grinding wheels 148 about the axis of the sleeve portion 42 of base 40 is uninterrupted so that the wheels 148 may be passed around the surface 28 of pipe 10 continuously in a given direction until the desired degree of grinding has been accomplished about the entire circumference of the end surface 28 of pipe 10.

When the grinding operation has been completed, the assemblies 114 may be drawn rearwardly by the operator through the manipulation of handles 150 and 152, the boomer handle 34 recoupled with the frame 40, the handle 94 replaced and turned by the operator to move the screw shaft 82 forwardly, thereby withdrawing the clamping pins 72 inwardly to release the assembly 28 from the pipe 10, and the assembly 26 then pulled rearwardly out of the pipe 10 and back to its stand-by condition suspended from the gantry boom assembly 18 in readiness for repetition of the process for performing a further grinding operation upon another pipe 10.

It is believed that it will now be apparent that the improved grinding apparatus contemplated by this invention is ideally adapted to accomplish all of the above mentioned and other worthwhile objects. It will be equally manifest, however, that certain minor modifications or changes could be made from the exact structure disclosed as a preferred embodiment for purposes of illustration without departing from the true spirit and intention of the invention. Accordingly, it is to be understood that the invention should be deemed limited only by the scope of the claims that follow.

Having thus described the invention what is claimed as new and desired to be secured by Letters Patent is:

1. In apparatus for grinding an end of a substantially cylindrical pipe of relatively large diameter, a frame; securing means on said frame adapted to extend into a pipe from an open end of the latter to be ground and operable for releasably securing said frame to said pipe, said securing means including shiftable elements on said frame adapted to be moved outwardly to engage the interior of said pipe for effecting a connection between said frame and said pipe and inwardly to avoid engagement with said pipe during installation or removal of said frame relative to said pipe; a tool carrier assembly; a grinding tool mounted on said assembly; supporting means mounting said assembly on said frame for revolution of said assembly about an axis aligned with the central axis of said pipe and for operative engagement of said tool with said end of said pipe; and force exerting means on said frame and operably coupled with said elements for simultaneously exerting outwardly directed forces upon the latter, said force exerting means including a shiftable member mounted on said frame for reciprocation along a path of travel aligned with said axis of revolution of said assembly, linkage means operably coupling said elements with said member, and power advantage means on said frame and operably coupled with said member for reciprocably moving the latter.

2. In apparatus as set forth in claim 1, wherein said power advantage means includes a rotatable shaft having separate couplings with said frame and said member, one of said couplings of said shaft being a threaded connection for simultaneous relative rotation and reciprocation, the other of said couplings of said shaft being a bearing connection for free relative rotational movement only.

3. In apparatus for grinding an end of a substantially cylindrical pipe of relatively large diameter, a frame; securing means on said frame adapted to extend into a pipe from an open end of the latter to be ground and operable for releasably securing said frame to said pipe; a tool carrier assembly; a grinding tool mounted on said assembly; and supporting means mounting said assembly on said frame for revolution of said assembly about an axis aligned with the central axis of said pipe and for operative engagement of said tool with said end of said pipe, said supporting means including structure rotatably mounted on said frames, and shiftable means mounting said assembly on said structure for both rotational movement of said assembly with said structure about the axis of rotation of the latter and movement of said assembly relative to said structure independently of said rotational movement of said assembly and said structure together, said shiftable means being arranged for carrying said assembly toward or away from said end of said pipe along a path of movement parallel to, but spaced outwardly from, said axis of rotation of said structure and comprising a pair of elongated, parallel linkage members of equal length each pivotally connected at one end thereof with said structure and at the opposite end thereof with said assembly.

4. In apparatus as set forth in claim 3, wherein is provided resilient means oppositely coupled with said assembly and said structure for yieldably urging said assembly and said structure toward a predetermined relative disposition.

5. In apparatus as set forth in claim 4, wherein is provided adjustable stop means for limiting relative movement in at least one direction between said assembly and said structure.

References Cited in the file of this patent

UNITED STATES PATENTS

| | | |
|---|---|---|
| 1,031,934 | Hunter | July 9, 1912 |
| 2,188,720 | McQuade | Jan. 30, 1940 |
| 2,414,731 | Forbes | Jan. 21, 1947 |

FOREIGN PATENTS

| | | |
|---|---|---|
| 631,536 | France | Dec. 22, 1927 |